United States Patent
Ramaswamy et al.

(10) Patent No.: US 7,539,654 B2
(45) Date of Patent: May 26, 2009

(54) USER INTERACTION MANAGEMENT USING AN ONGOING ESTIMATE OF USER INTERACTION SKILLS

(75) Inventors: Ganesh N. Ramaswamy, Mohegan Lake, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 11/041,134

(22) Filed: Jan. 21, 2005

(65) Prior Publication Data

US 2006/0167837 A1 Jul. 27, 2006

(51) Int. Cl.
*G06N 5/00* (2006.01)
(52) U.S. Cl. .......................................... 706/20; 706/45
(58) Field of Classification Search .................. 706/20, 706/45
See application file for complete search history.

(56) References Cited

U.S. PATENT DOCUMENTS

| | | | | |
|---|---|---|---|---|
| 6,405,159 | B2 * | 6/2002 | Bushey et al. ................. | 703/13 |
| 6,844,506 | B2 * | 1/2005 | Nuesch et al. ............ | 177/25.11 |
| 7,086,007 | B1 * | 8/2006 | Bushey et al. ............... | 715/762 |
| 7,089,499 | B2 * | 8/2006 | Steichen et al. ............. | 715/744 |

OTHER PUBLICATIONS

Burges. "A Tutorial on Support Vector Mchines for Pattern Recognition". 1998, Kluwer Academic Publishers, Boston. Data Mining and Knowledge Discovery 2, p. 121-167.*
Lippman. "An Introduction to Computing with Neural Nets". 1987, IEEE ASSP Magazine, Apr. 1987. pp. 4-21.*
L.R. Rabiner et al., "An Introduction to Hidden Markov Models," IEEE ASSP Magazine, pp. 4-16, Jan. 1986.
R.P. Lippmann, "An Introduction to Computing Neural Nets," IEEE ASSP Magazine, pp. 4-22, Apr. 1987.
C.J.C. Burges, "A Tutorial on Support Vector Machines for Pattern Recognition," Data Mining and Knowledge Discovery, vol. 2, pp. 121-167, 1998.

* cited by examiner

*Primary Examiner*—Wilbert L Starks, Jr.
(74) *Attorney, Agent, or Firm*—Anne V. Dougherty; Ryan, Mason & Lewis, LLP

(57) ABSTRACT

User interaction management techniques are disclosed. In a first aspect of the invention, an automated technique for managing interaction between a user and a system includes the following steps/operations. One or more behaviors associated with a user are observed as the user interacts with the system. A skill level of a user accessing the system is determined. Then, a user interaction profile is modified based on the determined skill level of the user. In a second aspect of the invention, an automated technique for generating a skill level classifier for use in classifying users interacting with a system includes the following steps/operations. Input from multiple users having various skill levels is obtained. Then, a classifier is trained using the obtained input from the multiple users such that the classifier automatically detects in which category of interaction skills a subsequent user belongs.

22 Claims, 2 Drawing Sheets

USER INTERACTION MANAGEMENT USING AN ONGOING ESTIMATE OF USER INTERACTION SKILLS

FIELD OF THE INVENTION

Principles of the present invention generally relate to techniques for managing a human-computer interface and, more particularly, to techniques for managing a human-computer interface using an ongoing estimate of user interaction skills.

BACKGROUND OF THE INVENTION

Different users have different interaction skills and experience in using computer-based systems. Some users may need extra guidance and more explicit instructions. Other users may not need any instructions since they follow the instructions from memory, or may be simply better skilled to interact with a system in a more efficient way regardless of their past interaction experience. This variance of user interaction skills creates difficulty in designing "one size fits all" user interfaces that will be suitable to a wide range of users. Furthermore, effective adaptability based on user skills and experience is not available in existing user interfaces.

This is particularly evident in conversational systems, where interaction management is known as dialog management, and is sequential by definition. The usability of a conversational system is therefore greatly affected by the dialog management method. A system that can not quickly adapt to the interaction skills of the user will easily result in slow tedious interaction for advanced users, and alternatively will be unusable for novice users.

SUMMARY OF THE INVENTION

Principles of the present invention provide user interaction management techniques.

In a first aspect of the invention, an automated technique for managing interaction between a user and a system includes the following steps/operations. A skill level of a user accessing the system is determined. Then, a user interaction profile is modified based on the determined skill level of the user.

In a second aspect of the invention, an automated technique for generating a skill level classifier for use in classifying users interacting with a system includes the following steps/operations. Input from multiple users having various skill levels is obtained. Then, a classifier is trained using the obtained input from the multiple users such that the classifier automatically detects in which category of interaction skills a subsequent user belongs.

In a third aspect of the invention, an automated technique for adapting a classifier for use in classifying users interacting with a system includes the following steps/operations. One or more behaviors associated with a user are observed as the user interacts with the system. Then, the classifier is adapted based on the one or more observed behaviors of the user.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

While principles of the present invention will be illustratively described below with reference to a computer system utilizing a Human Computer Interface (HCI), it is to be understood that principles of the invention are more generally applicable to any system that utilizes an interface with a user.

It is known that an HCI may be characterized as a single mode HCI (e.g., keyboard entry, conversational speech input) or a multimodal HCI (e.g., speech and pointing, keyboard and eye movement).

As will be illustratively explained, principles of the invention employ a classification methodology to detect in real time ("on the fly"), throughout the interaction with the user, the skill level of the user. Such classification methodology thus provides an ongoing estimate of user interaction skills. Different skill levels are pre-defined, and interaction models are pre-trained for them in an earlier stage. The models may be based on features such as use of advanced interaction methods (e.g., barge-in, response speed, drag and drop, user silence duration, etc.) and also external prior information on the user that may be available (e.g., age, relevant education, profession, etc.).

During deployment of a system that employs principles of the invention, it is to be understood that the system continuously gathers these features, and classifies the user into one of the pre-defined skill levels. The classification is performed using the pre-trained interaction models. Then, on the fly, the system changes the user interface based on that classification.

Figure 1:
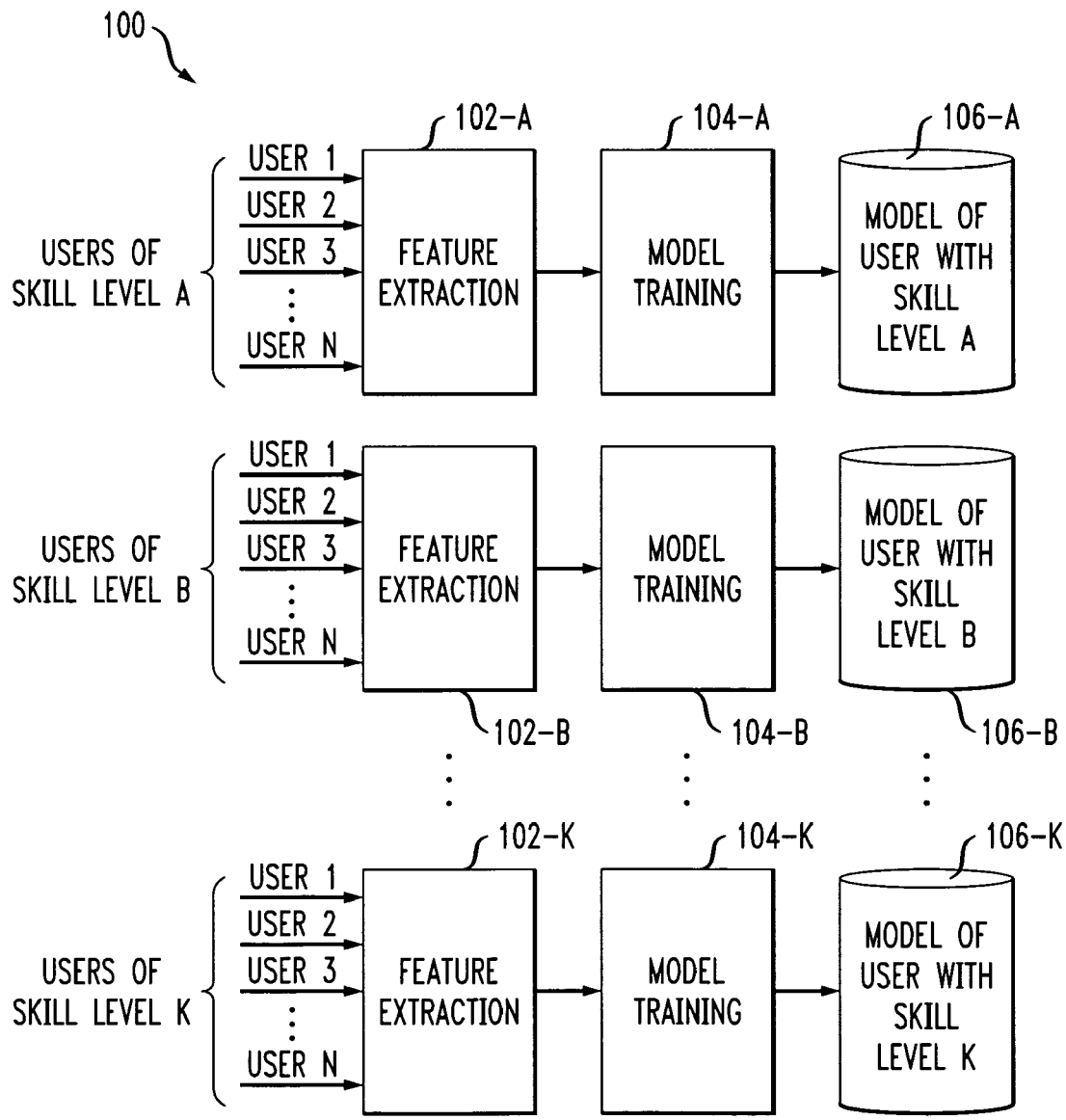
FIG. 1 is a diagram illustrating a process for training user interaction models, according to an embodiment of the present invention.
Figure 2:
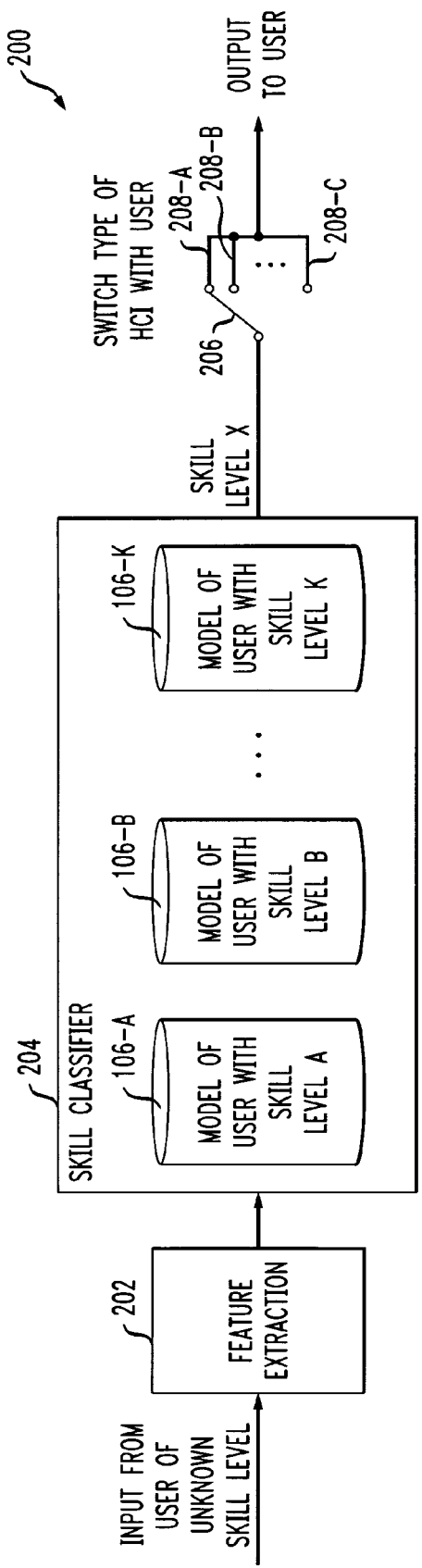
FIG. 2 is a diagram illustrating a system using a user skills classifier based on interaction models, according to an embodiment of the present invention.

FIGS. 1 and 2 depict principles of the invention for two different phases. FIG. 1 illustrates training of user interaction models, and FIG. 2 shows deployment of a system that uses the invention for the purpose of adapting the HCI to the skill level of the user.

Referring now to FIG. 1, a process is shown for training user interaction models, according to an embodiment of the present invention. More particularly, FIG. 1 illustrates how a classifier is trained to automatically classify incoming user interaction to the appropriate user skill level. The classifier works on features derived from the user interaction.

In the training process 100, as shown, features are extracted from the interaction of multiple users with the system, including a label that specified which skill level each user possesses. As shown, there may be N users. However, principles of the invention are not limited to any particular number of users. Feature extraction is performed by feature extraction modules 102-A, 102-B, ..., 102-K, where K is the number of skill levels that are classified. It is to be understood that principles of the invention are not limited to any particular number of skill levels. Further, as shown, feature extraction module 102-A is used to extract features from users of skill level A, feature extraction module 102-B is used to extract features from users of skill level B, and so on. Feature extraction is well known and therefore not described in further detail herein.

The classifier is then trained by observing the label of every feature set and attempting to automatically determine the mapping between the features and the user skill labels. In one example, as shown, the classifier includes individual models trained for every group of users that share the same skill level. Training of a model associated with skill level A is performed by model training module 104-A, training of a model associated with skill level B is performed by model training module 104-B, and so on. The resulting skill level models are depicted as 106-A, 106-B, . . . , 106-K.

Model training is well known and, therefore, not described in further detail herein. For example, the trained models may be statistical models such as Hidden Markov Models (HMMs). HMMs are described in detail, for example, in L. R. Rabiner et al., "An Introduction to Hidden Markov Models," IEEE ASSP Magazine, January 1986, the disclosure of which is incorporated by reference herein.

Another alternative is use of a discriminative classifier such as an Artificial Neural Network (ANN) or a Support Vector Machine (SVM). These classifiers are well known and, therefore, not further described herein. Neural networks are described in detail, for example, in R. P. Lippmann, "An Introduction to Computing with Neural Nets," IEEE ASSP Magazine, April 1987, the disclosure of which is incorporated by reference herein. SVMs are described in detail, for example, in C. J. C. Burgess, "A Tutorial on Support Vector Machines for Pattern Recognition," Data Mining and Knowledge Discovery, 1998, the disclosure of which is incorporated by reference herein. Further, the classifier may be trained using different well-known pattern recognition training methods.

Thus, it is to be appreciated that principles of the invention are not limited to any particular classifier training technique. Also, it is to be understood that the classifier is typically trained offline before deploying the run-time system.

Referring now to FIG. 2, a diagram illustrates a system using a user skills classifier based on interaction models, according to an embodiment of the present invention. That is, FIG. 2 depicts a system that employs the skill classifier generated during the training stage (FIG. 1).

As shown, system 200 includes a feature extraction module 202, a skill classifier 204 (including model of user with skill level A 106-A, model of user with skill level B 106-B, . . . , model of user with skill level K 106-K), switch 206, and human-computer interfaces (HCIs) 208-A, 208-B, . . . , 208-K.

A user with unknown skill level interacts with system 200. At this point, it is to be understood that classifier 204 is already trained to label users for the different skill levels based on the features extracted from the user interaction with the system.

System 200 extracts features from the user interaction using feature extraction module 202 and feeds them to classifier 204. Classifier 204, in turn, determines the skill level of the user using the trained models.

The skill level decision method depends on the classifier. For example, for a statistical model-based classifier, a score (related to the likelihood) is calculated for each interaction model, and the top scoring model is the classification decision. For an ANN, a single network may be trained with a number of outputs equal to the number of interaction models, and the winning neuron of the output layer determines the skill level.

System 200 then accordingly switches the type of interaction with the user. That is, based on the user skill level determined by classifier 204, switch 206 functionally switches between HCI 208-A, 208-B, . . . , 208-K such that an HCI appropriate for the determined skill level of the user is presented to the user.

Accordingly, for example, users that may be classified as belonging to a group that requires elaborate online help will be presented with a user interface that provides elaborate online help. Further, users belonging to a group that require the system to use shorter prompts, because the users are classified as advanced or power users, will be presented with such a user interface.

The following are some examples of features that may be extracted for use in determining skill level. However, principles of the invention are not limited to any particular feature or features.

For systems with keyboard input, features may include typing speed, response time from the time of display to the first keystroke, and latency between keys that are on different ends of the keyboard (indicating typing with multiple fingers) .

For systems with voice input, features may include use of barge-in to interrupt the played prompt, use of a conversational free style of speaking with the system, and skipping through turns in a mixed initiative dialog management system by speaking multiple data items in a single utterance.

For systems with mouse input, features may include speed of moving the mouse, clicking in small areas, use of mouse instead of keyboard, and use of drag and drop.

For systems with an eye movement tracking, features may include frequency of eye-originating operations, and number of attempts required to accomplish an input task using eye movement tracking.

Other types of input features may be employed. Electroencephalogram (EEG), which is a measurement of electrical activity in the brain, may be employed. Further, user interaction with the system may be performed using one or more biometric sensors. Thus, input features that may be employed include, for example, fingerprint, iris, retina, gait, face recognition, voice biometrics.

The following are some examples of different interaction profiles (e.g., HCIs) that a system can switch to based on the classifier results. However, principles of the invention are not limited to any particular interaction profile or profiles.

For systems with visual output, an interaction profile may include displaying more details on the same screen, skipping screens in a multi-screen process, and displaying multiple screens at the same time instead of sequentially.

For systems with speech output, an interaction profile may include providing shorter prompts, providing less explanation in prompts, switching to grammars that allow for more elaborate speech input, and switching to dialog management that allows for natural language input.

Figure 3:
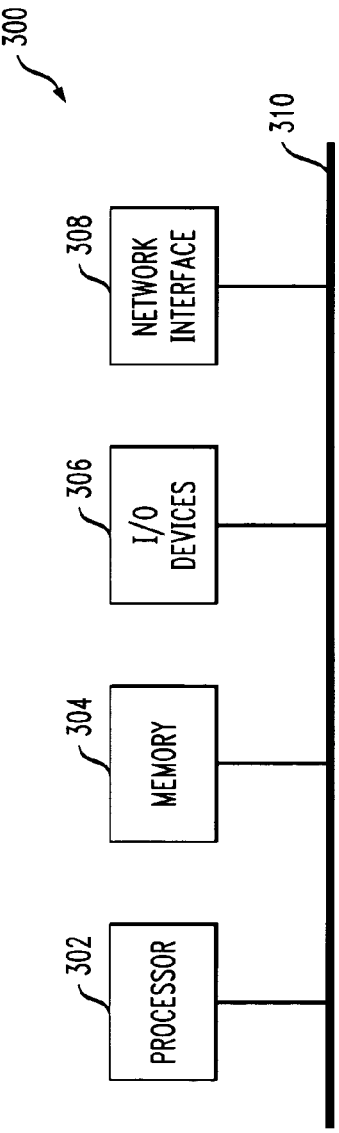
FIG. 3 is a diagram illustrating a computer system suitable for implementing user interaction management techniques, according to an embodiment of the present invention.

Referring lastly to FIG. 3, a diagram illustrates a computer system suitable for implementing user interaction management techniques, according to an embodiment of the present invention. For example, the illustrative architecture of FIG. 3 may be used in implementing any and all of the modules, components and/or steps described in the context of FIGS. 1 and 2.

As shown, the computer system 300 may be implemented in accordance with a processor 302, a memory 304, I/O devices 306, and a network interface 308, coupled via a computer bus 310 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, image capture device such as a camera, speech capture device such as a microphone, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing user interaction management services. By way of example, a service provider agrees (e.g., via a service level agreement or some informal agreement or arrangement) with a service customer or client to provide user interaction management services. That is, by way of one example only, the service provider may host the customer's web site and associated applications. Then, in accordance with terms of the contract between the service provider and the service customer, the service provider provides user interaction management services that may include one or more of the methodologies of the invention described herein. For example, the service provider may host a web site and applications of the customer, in accordance with the user interaction management techniques of the invention, such that the users of the applications are provided with interaction experiences commensurate with their skill capabilities.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An automated method of managing a user interface between a user and a system, wherein the user interface and the system are implemented via a computer, the method comprising the computer performing the steps of:
    observing one or more behaviors associated with a user as the user interacts with the system;
    automatically determining a skill level of the user accessing the system in real time based on the observed one or more behaviors;
    modifying a user interaction profile based on the determined skill level of the user;
    switching the user interface as the user interacts with the system to one of a plurality of pre-trained interaction models for a pre-defined skill level in accordance with the user interaction profile; and
    presenting the switched user interface to the user.

2. The method of claim 1, wherein the skill level determination step further comprises classifying input obtained from the user based on pre-trained skill level models.

3. The method of claim 2, wherein the skill level models are previously trained from input obtained from multiple users having various skill levels.

4. The method of claim 2, wherein the classifying step further comprises extracting one or more features from the obtained user input.

5. The method of claim 1, wherein the interaction profile modifying step further comprises selecting a human-computer interface to be presented to the user from among a plurality of human-computer interfaces.

6. The method of claim 5, wherein a human-computer interface is one of a single mode interface or a multimodal interface.

7. The method of claim 1, wherein user interaction with the system is conversational.

8. The method of claim 1, wherein user interaction with the system is performed using at least one of a keyboard, a mouse and a monitor.

9. The method of claim 1, wherein user interaction with the system is performed using gesturing and pointing.

10. The method of claim 1, wherein user interaction with the system is performed using electroencephalogram input.

11. The method of claim 1, wherein user interaction with the system is performed using one or more biometric sensors.

12. An automated method of generating a skill level classifier for use in classifying users interacting with a system via a computer, the method comprising the computer performing the steps of:
    obtaining input from multiple users having various skill levels;
    training a classifier using the obtained input from the multiple users such that the classifier automatically detects in which category of interaction skills a subsequent user belongs;
    switching a type of interaction between the subsequent user and the system to one of a plurality of pre-trained interaction models for a pre-defined skill level in accordance with the classifier; and
    presenting the switched type of interaction to the subsequent user.

13. The method of claim 12, wherein the classifier comprises individual models for interaction skill categories, each model being trained from labeled user data.

14. The method of claim 12, wherein the classifier comprises one or more artificial neural networks.

15. The method of claim 12, wherein the classifier comprises a support vector machine.

16. The method of claim 12, wherein the classifier comprises a pattern recognition method.

17. Apparatus for managing a user interface between a user and a system, wherein the user interface and the system are implemented via a computer, comprising:
    a memory; and
    at least one processor coupled to the memory and operative to: observe one or more behaviors associated with a user as the user interacts with the system; automatically determine a skill level of the user accessing the system in real time based on the observed one or more behaviors; modify a user interaction profile based on the determined skill level of the user; switch the user interface as the user interacts with the system to one of a plurality of pre-trained interaction models for a pre-defined skill level in accordance with the user interaction profile; and present the switched user interface to the user.

18. Apparatus for generating a skill level classifier for use in classifying users interacting with a system via a computer, comprising:
    a memory; and
    at least one processor coupled to the memory and operative to: obtain input from multiple users having various skill levels; train a classifier using the obtained input from the multiple users such that the classifier automatically detects in which category of interaction skills a subsequent user belongs; switch a type of interaction between the subsequent user and the system to one of a plurality of pre-trained interaction models for a pre-defined skill level in accordance with the classifier; and present the switched type of interaction to the subsequent user.

19. An article of manufacture for managing a user interface between a user and a system, wherein the user interface and the system are implemented via a computer, comprising a machine readable medium containing one or more programs which when executed implement the steps of:

observing one or more behaviors associated with a user as the user interacts with the system;

automatically determining a skill level of the user accessing the system in real time based on the observed one or more behaviors;

modifying a user interaction profile based on the determined skill level of the user;

switching the user interface as the user interacts with the system to one of a plurality of pre-trained interaction models for a pre-defined skill level in accordance with the user interaction profile; and presenting the switched user interface to the user.

20. An article of manufacture for generating a skill level classifier for use in classifying users interacting with a system via a computer, comprising a machine readable medium containing one or more programs which when executed implement the steps of:

obtaining input from multiple users having various skill levels;

training a classifier using the obtained input from the multiple users such that the classifier automatically detects in which category of interaction skills a subsequent user belongs;

switching a type of interaction between the subsequent user and the system to one of a plurality of pre-trained interaction models for a pre-defined skill level in accordance with the classifier; and presenting the switched type of interaction to the sub subsequent user.

21. A method of providing a service for managing a user interface between a user and a system, wherein the user interface and the system are implemented via a computer, the method comprising the computer performing the step of:

a service provider enabling the steps of: observing one or more behaviors associated with a user as the user interacts with the system; automatically determining a skill level of the user accessing the system in real time based on the observed one or more behaviors; causing modification of a user interaction profile based on the determined skill level of the user; switching the user interface as the user interacts with the system to one of a plurality of pre-trained interaction models for a pre-defined skill level in accordance with the user interaction profile; and presenting the switched user interface to the user.

22. A method of providing a service for generating a skill level classifier for use in classifying users interacting with a system via a computer, comprising the step of:

a service provider enabling the steps of: obtaining input from multiple users having various skill levels; training a classifier using the obtained input from the multiple users such that the classifier automatically detects in which category of interaction skills a subsequent user belongs; switching a type of interaction between the subsequent user and the system to one of a plurality of pre-trained interaction models for a pre-defined skill level in accordance with the classifier; and presenting the switched type of interaction to the subsequent user.

* * * * *